Nov. 11, 1952     H. A. OLSON ET AL     2,617,352

AUTOMATIC COFFEE BREWER AND VALVE STRUCTURE EMPLOYED THEREIN

Filed April 10, 1950     2 SHEETS—SHEET 1

Inventors:
Hans A. Olson
Christina O. C. Olson
By Soans, Pond and Anderson
Atty's Nov. 11, 1952 H. A. OLSON ET AL 2,617,352
AUTOMATIC COFFEE BREWER AND VALVE STRUCTURE EMPLOYED THEREIN
Filed April 10, 1950 2 SHEETS—SHEET 2
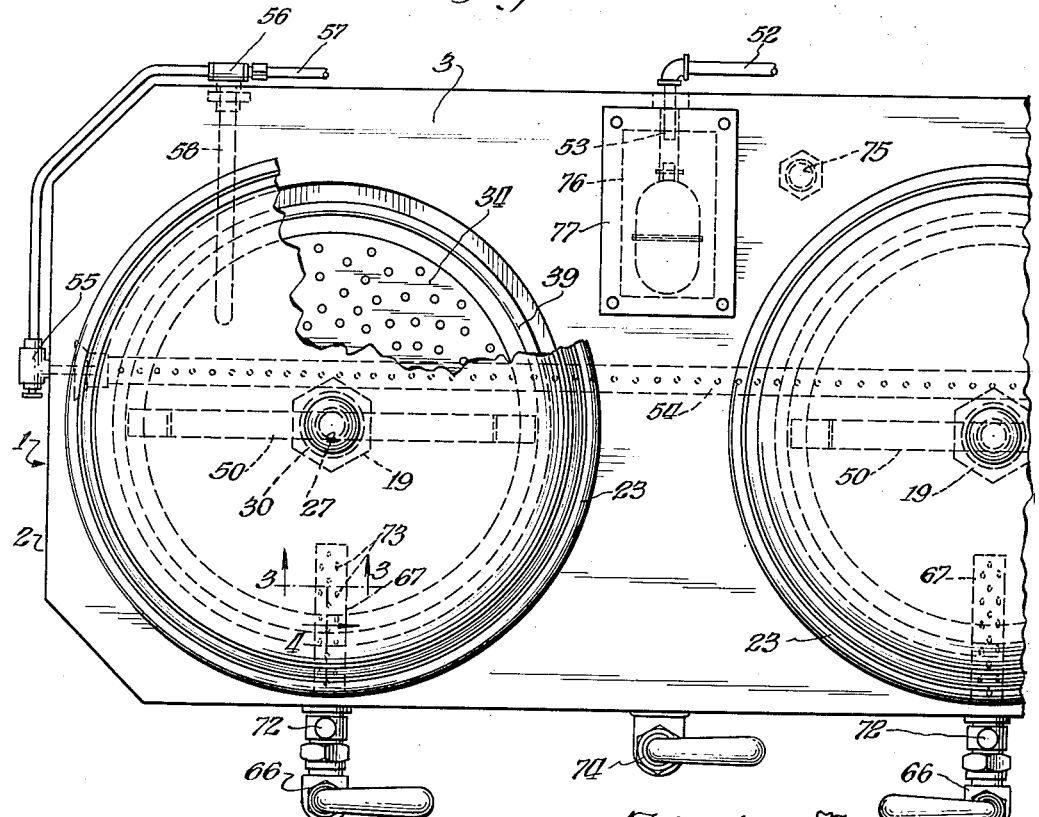
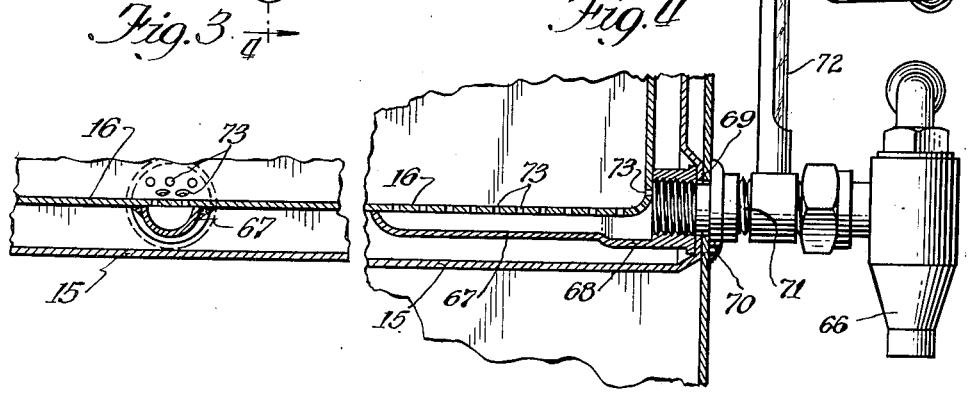
Inventors:
Hans A. Olson
Christina O. C. Olson
By: Loans, Pond and Anderson
Atty's.

Patented Nov. 11, 1952

2,617,352

UNITED STATES PATENT OFFICE 2,617,352

AUTOMATIC COFFEE BREWER AND VALVE STRUCTURE EMPLOYED THEREIN

Hans A. Olson and Christina O. C. Olson, Chicago, Ill.

Application April 10, 1950, Serial No. 155,088

15 Claims. (Cl. 99—305)

This invention relates to a device for brewing coffee and to certain details of structure employed therein.

The main object of the invention is to provide a coffee brewing device whereby the beverage may be brewed substantially automatically in respect of both the time of brewing and the quantity which is brewed. Other objects of the invention are to provide an automatic coffee-making apparatus wherein provision is made to facilitate the brewing of successive batches of coffee from like quantities of ground coffee beans, with like treatment as to time, heat, and quantity of water, thereby to insure the brewing of uniformly good batches of the beverage; to provide an apparatus for the purpose indicated which can be kept ready for use on a moment's notice, and whereby coffee may be made ready within a minimum of time consistent with the production of good-tasting coffee; to provide apparatus of the character indicated wherein the customary manual transfer of water from a water heating chamber to a coffee brewing chamber is eliminated; to provide an apparatus of the character indicated of relatively simple construction and which is dependable in operation; and to provide such equipment which can be produced at a cost which bears a favorable comparison with the cost of producing present commercial coffee-making equipment.

Other objects and advantages of the invention will be understood by reference to the following specification and accompanying drawings (2 sheets) in which there is illustrated coffee-brewing apparatus embodying a selected form of the invention.

In the drawings:

Fig. 2 is a fragmentary top view;

Figure 1:
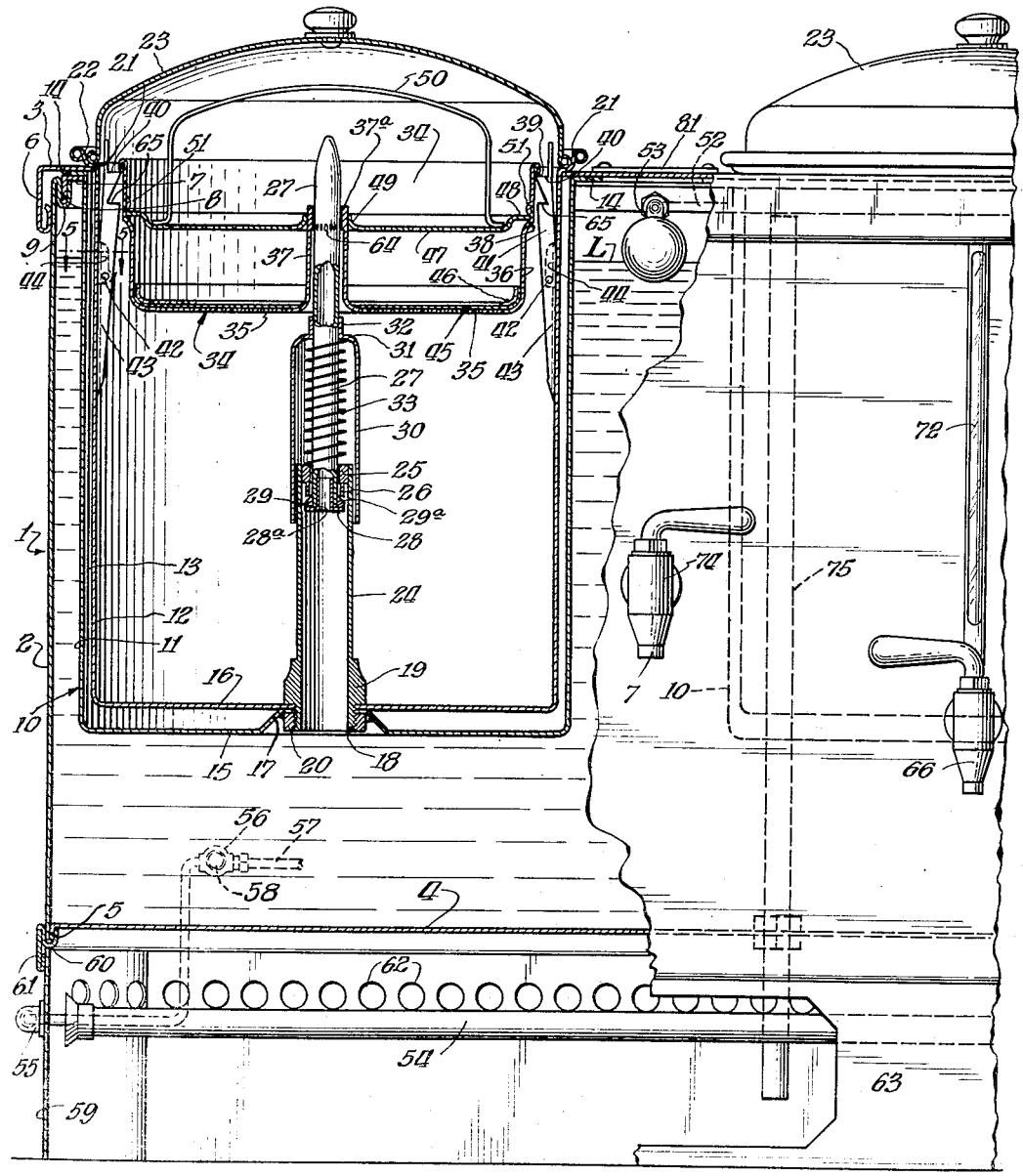
Fig. 1 is in part a front elevation, and in part a section.
Figure 5:
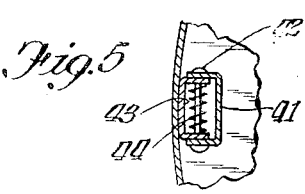

Figs. 3 and 4 are cross-sections on the lines 3—3 and 4—4 respectively of Fig. 2; and Fig. 5 is a fragmentary section on the line 5—5 of Fig. 1.

The coffee maker shown in the drawings comprises an outer tank 1 having a side wall 2 made of suitable sheet metal such as stainless steel, or other suitable non-corroding metal which presents an attractive appearance. A top 3 of similar metal fits telescopically over the upper end of the tank. The side wall 2 is formed into a more or less rectangular tube with angled corners as indicated in Fig. 2, and it is provided with a bottom 4 (Fig. 1) which is set into the tank and provided with a depending flange 5 which is welded, or otherwise secured to the lower marginal portion of the side wall to provide a liquid-tight bottom for the tank.

The top 3 has a depending side flange 6 which fits telescopically over the upper end portion of the outer tank, the fit being tight but, nevertheless, permitting removal of the top when desired.

The outer tank 1 is also provided with an inside top 7 which has a depending peripheral flange 8 which is tightly fitted, but nevertheless removably seated in an upwardly facing channel 9 formed integrally with the upper edge portion of the side wall 2 of the tank.

A double-walled cylindrical receptacle or container 10 is suspended in the tank 1 and comprises outer and inner receptacles 11 and 12, the inner receptacle being somewhat smaller than the outer receptacle so as to provide an air space or insulating jacket 13 between the inner and outer receptacles. The outer receptacle 11 is supported on the inner cover 7 by means of a laterally outwardly extending flange 14 formed on the upper edge of the side wall of the receptacle, said flange resting on or being soldered or otherwise secured to the inner cover 7, the latter being, of course, provided with an opening through which the receptacle is inserted into the main tank 1 as shown.

The bottom walls 15 and 16 of the outer and inner receptacles are clamped together, the bottom wall 15 having a central portion 17 offset upwardly into face to face contact with a central portion of the bottom wall 16. These central portions of the bottom walls are apertured to receive an externally threaded nipple portion 18 of a fitting 19, said nipple portion being screwed into a nut 20 which is soldered or otherwise fixedly secured to the bottom of the upwardly offset central portion of the bottom wall 15 of the outer receptacle. The bottom wall portions are accordingly clamped together between the fitting 19 and the nut 20. Spacing of the side wall 11 and 12 of the inner receptacle is maintained at the upper ends of the side walls by fitting the upper end portion of said inner receptacle in an opening in the outer cover 3. Said upper end portion of the inner receptacle 12 is provided with a laterally outwardly extending flange portion 21 which rests on the cover 3, and an upwardly extending flared flange portion 22, the said flange portions 21 and 22 providing a seat for receiving and positioning a domed cover 23.

The fitting 19, previously referred to, includes an upwardly extending tube element 24 which has its upper end provided with an inside collar 25 having a depending annular flange 26, the lower end of which constitutes a valve seat, as will presently appear. This collar 25 is formed integrally with the tube 24 or fitted thereto and soldered or otherwise fixedly secured in place.

A hollow, elongated tube 27 has its lower portion freely slidable in said collar 25. The lower end portion of said tube is provided with a laterally outwardly projecting annular flange member 28 which is formed on one end of a sleeve 28a. A valve washer 29 of suitable resilient material such as rubber is positioned on said flange 28 and is provided with a beveled upper face 29a which consitutes a valve seat complementary to the valve seat formed by the lower end of the annulus 26. If desired the valve seat 29a may be ground on an integral flange-like part of the tube 27 but it appears preferable that it be provided in the manner shown. The sleeve 28a is a press fit in the tube 27 and the washer 29 is locked in place between said flange 28 and the adjacent end of the tube 27.

A hood tube 30 is disposed around the lower portion of the tube 27 and has upper end wall and collar formations 31 and 32, respectively, the latter being soldered or otherwise fixedly attached to the tube 27. A coiled compression spring 33 is disposed about the tube 27 between the upper end of the tube 24 (or said collar 25) and the top wall 31 of said hood, said spring serving to yieldingly support the hood 30 and tube 27 in a predetermined position such as illustrated in Fig. 1.

Ground coffee is placed in a shallow pan 34 which is positioned in the upper portion of the double-walled receptacle 10. This pan 34 has a bottom wall 35, an outer side wall 36, and an upwardly extending central sleeve or inner wall 37 surrounding the tube 27. This sleeve 37 is of such internal diameter as to be capable of freely slidably receiving the collar 32 when the coffee basket or pan 34 is lowered as will hereinafter be explained, and said lower portion is formed with a suitably rounded or flared entrance portion which will facilitate entrance of said collar 32 into the sleeve. The upper end portion of said sleeve 37 is provided with a reduced diameter portion 37a which is nevertheless a free sliding fit on said tube 27.

The side wall 36 of the coffee pan 34 is formed to provide an upwardly facing seat or shoulder 38 intermediate the top and bottom edges of the side wall, and the upper edge of said side wall is provided with an outwardly extending flange, preferably in the form of an outwardly and downwardly rolled bead 39.

The pan or basket 34 is initially supported in the upper end portion of the receptacle 10 by seating diametrically opposed portions of its upper edge bead 39 on seats 40 provided at the upper ends of a pair of latch members 41. These latch members 41 are pivotally mounted as indicated at 42 on suitable brackets 43 which are soldered or otherwise secured to the inside of the inner container wall 12. Suitable torsion springs 44 around the pivots 42 and provided with end legs in a well-known manner, bearing respectively against the brackets 43 and the latches 41 normally urge the supporting latches 41 to rock inwardly at their upper ends. The springs 44 are in effect housed by said brackets and latches and the latter parts are shaped to avoid the formation of sharp projections which would catch in wiping material and thereby hamper cleaning of the receptacles.

These supporting latches 41 are so arranged that their upper end portions are spaced inwardly from the container wall 12 when the coffee pan 34 is supported on said shoulders 40 as shown. Hence, these latches 41 may be moved outwardly to withdraw the supporting shoulders 40 from under the bead 39, thereby to permit dropping of the pan 34.

The bottom wall 35 of the coffee pan or basket is provided with a multiplicity of perforations of small size and a filter paper or cloth 45 is placed over this perforated bottom 35. This filter paper is preferably of such size that its outer periphery will turn upwardly in the lower corner of the pan, and a retaining ring 46 is inserted inside of and over the filter paper to hold it in place. This ring 46 is suitably shaped in cross-section to fit snugly in the lower corner of the pan 34 with the filter 45 in place the slight compressibility of the filter paper aiding in attaining friction seating of said ring 46 whereby it is readily removably held in place.

The ground coffee is placed in the pan over the filter paper, and a cover 47 is placed over the ground coffee, a peripheral portion of the cover being seated on the shoulder 38 of the pan. This cover 47 has its peripheral portion 48 and a central portion 49 turned upwardly to provide a shallow, saucer-like member, the central portion of the cover being suitably apertured to fit freely around the central stem 37 of the pan 34. The downwardly offset intermediate area of the cover 47 is provided with a multiplicity of perforations which will permit water delivered into the saucer-like cover to more or less trickle downwardly into the charge of ground coffee contained in the pan 34, said water serving to extract the coffee flavor, and ultimately penetrating through the filter paper 45 and the perforations in the bottom 34 of the pan and into the inner receptacle 12.

The cover 47 is provided with a bale-like handle 50 which is rigidly secured at its ends to the cover. The peripheral portion 48 of the cover 47 is provided with at least one notch to permit passage of said peripheral portion over a knob 51 pressed inwardly from the side wall 36 of the coffee pan immediately above the shoulder 38. A pair of knobs 51 are provided at diametrically opposed points so that the periphery of the cover 47 may be inserted by downward and lateral movement into place on the shoulder 38 and under one of the knobs 51, after which the opposite, notched edge portion of the cover may be moved downwardly past the other knob 51. By rotating the cover, both knobs 51 will overlie the margin of the cover.

Water is delivered into the main tank 1 from a water supply pipe 52 through a suitable float controlled valve structure indicated at 53. This float controlled valve is so arranged as to normally maintain a water level indicated by the line L. The construction of the float controlled valve 53 is well known and, therefore, is not shown or described in detail.

The tank 1 is seated on a suitable stove for heating the water. In this instance, the stove is illustrated as comprising a single gas burner 54 connected through a suitable mixture-controlling valve 55 and a thermostatic gas valve 56 to a gas supply line 57. The thermostatic valve 56 includes a thermostatic element 58 which projects into the water-containing space of the tank 1 so that the flow of gas to the burner is controlled by the temperature of water in the tank. The valve 56 is of a known, adjustable type whereby the water temperature may be maintained substantially constant, or, at least, within a range of a few degrees at a predetermined desired temperature.

The burner 54 is supported in a suitable frame structure including an outer side wall portion 59 which may be of the same kind of metal or material as the wall 2 of the tank 1. The stove unit may advantageously be made of the same length and width as the main tank body to provide a smooth, clean-cut appearance. The tank body may be seated on the stove section by seating the lower marginal portion of the tank body in an upwardly facing channel 60 which rests on the upper edge of the side wall 59 of the stove and is positioned thereon by means of a depending collar-like portion 61 which fits around the outside of the upper portion of the stove structure. This collar element 61 may be made independently of and separable from both the stove structure and the tank structure so that these parts may be separated and replaced independently of each other when necessary or desirable. Suitable ventilation openings and access openings for lighting the gas burner may be provided in the side wall 59 of the stove structure as indicated at 62 and 63.

To make coffee with the described apparatus, water is heated in the tank 1 to the desired temperature, for example, a selected temperature usually within the range of about 170° F. to 200° F. (it is preferable that coffee be not boiled). The pan 34 is charged with a predetermined amount of coffee and seated on the latch shoulders 40 as shown. After the water has been heated to the required temperature, brewing of coffee may be started by pressing the latch members 41 outwardly to withdraw the supporting shoulders 40 from under the bead 39 of the coffee basket, whereupon said basket will, by gravity, move downwardly. The bottom of the coffee pan will strike against the top wall 31 of the hood 30 and be seated thereon to thereby transmit the downward movement of the coffee pan to the hood 30 and the tube 27. It should be observed that the spring 33 is carefully selected so that it will permit the indicated downward movement because of the weight of the pan structure and its charge of substantially dry coffee. The dropping of the pan into engagement with the end 31 of the hood serves to impart a shock load to the hood 30 and tube 27 to initiate downward movement thereof so that any possible tendency for these parts to stick in normal up position is effectively overcome.

The extent of downward movement of the pan structure 34 relative to the tube 27 is sufficient to cause the upper end of the central tube 37 of the pan structure to move to a position just below a plurality of openings 64 provided in the tube 27. These openings 64 are normally located above the water level L. The coffee-loaded pan structure, together with the tube 27 will move downwardly as a unit a suitable distance after the pan engages the end 31 of the hood, in this instance slightly more than the depth of the coffee pan structure between its bottom wall and its cover 47 so that the openings 64 in the tube 27 will be brought to a position well below the water level L. Water will then flow upwardly through the tubes 24 and 27 and squirt in small streams out of the openings 64 into the recessed area of the saucer-like cover 47. The perforations in the cover 47 will permit the water so delivered to flow downwardly into the charge of coffee, and thence through said charge and out of the perforated bottom of the pan to be collected in the receptacle 10. The top of the tube 27 is closed as shown to prevent water from pouring out of said upper end when said upper end is below said water level.

The coffee holder 34 remains in lowered position until liquid coffee collected in the container 10 rises sufficiently to more or less float the coffee holder upwardly. This "floating" action occurs because of the lifting force of the spring 33 which in combination with the lifting force of the liquid, is sufficient to elevate the coffee basket or holder 34. In one typical, practical example of the device the coffee basket, when charged with one pound of coffee, weighs a total of about two and one quarter pounds. The spring 33 is a one and one quarter pound spring. When the charged coffee basket is buoyed up by the liquid coffee, its weight is, in effect, reduced to such an extent that the spring is enabled to lift the coffee basket as aforesaid.

The tube 27 will move upwardly in unison with the coffee holder and such upward movement will be sufficient in extent to return the holes 64 to an elevation above the water level, whereupon the delivery of water ceases. The brewing of coffee is then finished except for the completion of the percolation of previously delivered water through the coffee charge and into the container 10.

The liquid collected in the receptacle 10 will not normally float the coffee holder 34 to its starting position, but will closely approach the same and the bead 39 will be located somewhere between the primary seat 40 and a secondary seat or shoulder 65 on each of the latch members 41. Upon withdrawal of the first few cups of coffee from the receptacle 10, the coffee basket will settle downwardly and said bead 39 will come to rest on said secondary seats 65 to thereby arrest downward movement of the basket 34. Hence, the ground coffee stock does not normally remain in soak in the prepared liquid coffee. The cover 23 and the coffee pan 34 may now be removed and the pan cleaned, recharged and replaced in readiness for making of another batch of coffee after the first batch is used up.

If desired, additional hot water may be manually poured over the suspended coffee basket to stretch the quantity of the beverage. If that is to be done, the basket 34 should be manually raised to seat on the primary shoulders 40 of the latches, thereby, also causing the central sleeve portion 37 of the basket to close the openings 64; this substantially eliminates any possibility of splashing any coffee colored or flavored water into the tube 27 and thence into the water in the tank 2.

In the typical structure hereinbefore referred to, three gallons of coffee are brewed in each receptacle 10 and it takes about six minutes to do so. The tank 1 holds about 12 gallons of water.

During the operation of brewing coffee as above explained, water, usually hot water, will enter the main tank through the float-controlled valve 53 inasmuch as the level L will necessarily drop as water flows from said main tank, through the tubes 24 and 27, and thence into the coffee receptacle 10. The rate at which water is transferred from the tank 1 into the receptacle 10 is not very fast (approximately two quarts per minute) so that the stove is able to maintain the water temperature with but very little drop during the brewing operation, especially if hot water is delivered to the tank.

It is preferable that the tank 1 be large enough to accommodate two or more units of the described brewing apparatus as illustrated in the drawings so that a supply of coffee may always be ready in one or the other of the units.

For withdrawing coffee from the units, a suitable faucet 66 is connected to each receptacle 10, this faucet being detachably connected to a pipe 67 which extends approximately horizontally into the bottom structure of the receptacle. The pipe 67 is a semicylindrical pipe-like section and its open side is soldered or similarly secured to the bottom wall 16 of the inner receptacle 12 in a leak-proof manner. At the outer end of said pipe section, there is an enlargement 68 which is cut to fit tightly against the outside of the bottom and the rounded corner portion of said receptacle, this enlargement being also soldered or similarly secured to said receptacle in a leak-proof manner. The outer end portion of the enlargement is flat and seats against an outwardly pressed flat-faced portion 69 of the outer receptacle. The flat outer face of the portion 69 bears against the flat wall 2 of the main tank and serves to aid in spacing the outer receptacle 11 from the tank wall 2. Suitable sealing gaskets may be interposed between these interengaging flat faces but I prefer to solder the end of the enlargement 68 to the wall portion 69 to provide a leak-proof joint at this point.

The wall portions 11 and 12 are clamped together between the end of the enlargement 68 and a flange 70 adjustably mounted on a fitting 71 which is screwed into the said enlargement 68. A gauge glass 72 and the faucet 66 are detachably secured to said fitting 71 in any suitable manner.

The bottom wall and side wall portions overlying said pipe section 67 and said enlargement 68 are perforated as shown at 73 so that the contents of the receptacles 12 may flow into said pipe section and be drained off through said faucet.

A faucet 74 may be provided for permitting withdrawal of hot water from the main tank 1 when desired. An overflow pipe 75 may also be provided in the main tank 1 to prevent overfilling thereof and to relieve any accumulation of water vapor (or steam if the latter should perchance be generated). The upper end of this overflow pipe 75 should be located at least slightly above the normal water level L so that water will not normally flow out of the tank through said overflow pipe.

During the brewing of coffee, i. e., when the coffee pan 34 is in a down position, some small amount of water will be permitted to leak between the collar 25 and the outside of the tube 27, and thence down between the tube 24 and the hood or bonnet 30. The small amount of water which thus bypasses the coffee pan 34 is insignificant and does not noticeably effect the strength of the coffee produced. When the pan 34 is elevated and the spring 33 permitted to return the tube 27 and hood 30 to their normal up positions, the indicated leakage will be shut off by the seating of the valve seat 29 against the lower end of the valve tube 26. Hence, when coffee is standing in the receptacle 10, and prior to the brewing of such coffee, there will be no leakage of water from the tank 1 into the receptacle 10 in the manner indicated possible when coffee is actually being brewed.

The described arrangement is wholly automatic in respect of the actual brewing of coffee in that it eliminates personal judgment as to the time element involved and in respect of the quantity and rate at which water is passed through the coffee charge, these factors being wholly automatic and controlled by the size of the receptacle 10 and by the size of the tube 27 and the discharge openings 64 therein which control the flow of water. The holes 64 should be so related in size to the holes in the basket cover 47 as to avoid overflowing or flooding of the latter. These openings may, of course, be selected of such size as to produce the desired water flow, and they are preferably non-adjustable so that the standards adopted by the manufacturer of the device will normally be maintained at all times. It should also be observed that the flow of water from the tank into the receptacle is at the low pressure of only the head of water which occurs when the tube section 27 is lowered to position the outlet holes 64 below the water level L. This also has a bearing on the rate of water flow. Furthermore, safety is attained by this non-pressure operating arrangement.

The described arrangement is also automatic in respect of the supply of water to the tank 11, and in respect of the heat delivered by the stove to heat the water and to maintain it at selected temperature.

When the structure is to be taken apart for cleaning or other purposes, the faucet 66 and the fitting 71 are unscrewed, and the domed cover 23 and the coffee basket 34 are removed. Then the tube 24 is unscrewed from the nut 20, thereby permitting separation of the inner and outer containers 11 and 12. The inner container 12 may then be lifted out of the tank, after which the outer cover 3 may be removed and then the outer receptacle 11 and inner top 7.

To facilitate access to the float valve without completely disassembling the structure, an access opening 76 and removable cover plate 77 may be provided on the outer cover 3, the inner cover being correspondingly provided with an opening and cover plate.

The described double cover structure (3 and 7) provides adequate support for the receptacles 10 without bracing or re-enforcing either of the covers, and provides an air jacket insulation over the top of the device where most heat is lost. The inner cover to which the outer receptacle 11 is attached, is a sufficiently tight friction fit in the channel 9 to prevent upward displacement of the cover by the buoyant effect of the water in the main tank on said receptacle 11. If found necessary or desirable, suitable disengageable devices may be employed to fasten the cover to the tank.

The weight or gravity actuated valve structure, i. e., the valve comprising the tube 26 and the valve seat 29 is a unique arrangement in a coffee brewing device, and may be applicable to other situations where similar considerations govern the required opening and closing of the valve.

Various changes in the described details of construction may be made while retaining the principles embodied in the described structure.

We claim:

1. A coffee brewing device of the class described, comprising a tank for containing hot water, means for automatically maintaining water to a predetermined level in said tank, a receptacle supported in said tank so as to be partially above and partially below said water level, a coffee holder, means for temporarily supporting said coffee holder in elevated position in the upper portion of said receptacle, a conduit communicating with the inside of said tank and extending vertically in said receptacle and through said coffee holder, said conduit comprising a stationary part and a section which is vertically movable relative to said stationary part, said movable section having an outlet opening which is located above said water level when said movable section is in elevated position, means normally maintaining said movable section in elevated position, said coffee holder being vertically movable relative to said conduit and operative by its weight to lower said section to position said outlet opening below said water level when said holder is released from said supporting means.

2. A coffee brewing device of the class described, comprising a tank for containing hot water, means for automatically maintaining water to a predetermined level in said tank, a receptacle supported in said tank so as to be partially above and partially below said water level, a coffee holder, means for temporarily supporting said coffee holder in elevated position in the upper portion of said receptacle, a conduit communicating with the inside of said tank and extending vertically in said receptacle and through said coffee holder, said conduit comprising a section which is vertically movable and which is provided with an outlet opening above said water level when said section is in elevated position, means normally maintaining said movable section in elevated position, said coffee holder being vertically movable and being so related to said movable conduit section as to be operative as an incident to downward movement of the holder when released from said supporting means to lower said section to position said outlet opening below said water level, whereby water will be caused to flow out of said discharge opening and delivered into said coffee holder and thence into said receptacle.

3. A coffee brewing device of the class described, comprising a tank for holding hot water, means for automatically maintaining water to a predetermined level in said tank, an open-topped receptacle supported in said tank so as to be partially above and partially below said water level, a coffee holder, means for temporarily supporting said coffee holder in overyling relation to the area and adjacent to the open top of said receptacle, a conduit communicating with said tank below said water level and having a section supported for vertical movement and provided with an outlet opening located above said water level when said section is in an up position, said coffee holder and said section having interengageable parts whereby said holder is operative upon downward movement thereof incident to release of said temporary supporting means, to effect downward movement of said section so as to lower said outlet opening to a position below said water level, thereby to cause water to flow through said conduit, said outlet opening being arranged to discharge water into said coffee holder for percolation therethrough and discharge therefrom into said receptacle.

4. A coffee brewing device of the class described, comprising a tank for holding hot water, means for automatically maintaining water to a predetermined level in said tank, an open-topped receptacle supported in said tank so as to be partially above and partially below said water level, a coffee holder, means for temporarily supporting said coffee holder in overlying relation to the area and adjacent to the open top of said receptacle, a conduit communicating with said tank below said water level and having a section supported for vertical movement and provided with an outlet opening located above said water level when said section is in an up position, said coffee holder and said section having interengageable parts whereby said holder is operative upon downward movement thereof incident to release of said temporary supporting means, to effect downward movement of said section so as to lower said outlet opening to a position below said water level, thereby to cause water to flow through said conduit, said outlet opening being arranged to discharge water into said coffee holder for percolation therethrough and discharge therefrom into said receptacle, the fluid coffee collected in said receptacle serving to float and elevate said coffee holder from its lowered position whereby said movable conduit section is incidentally permitted to return upwardly to an elevated position in which its discharge opening is above said water level to thereby stop the flow of water through said conduit, and means for causing such return movement of said conduit section.

5. A coffee brewing device according to claim 3 wherein the said conduit comprises a fixed tube portion in which the vertically movable section is slidable, and wherein the outlet opening in said section is arranged to project a stream of water laterally from said section into said coffee holder.

6. A coffee brewing device according to claim 3 wherein the vertically movable section of the conduit is a tube which extends through the coffee holder approximately axially thereof, and which tube is provided with a plurality of laterally extending outlet openings in circumferentially spaced relation to each other so that the water discharged from said tube is more or less uniformly distributed to the coffee holder.

7. A coffee brewing device according to claim 3 wherein the said conduit has a vertically disposed fixed tube section, and wherein the vertically movable section is a tube section freely slidable inside of said fixed section, said movable and fixed sections being provided with valve means located within said fixed section for preventing leakage of water between said sections when said movable section is in up position.

8. Coffee brewing equipment comprising an open-topped water tank, inner and outer covers removably mounted on top of said tank, float valve means for maintaining water to a predetermined level in said tank, a hollow-walled receptacle comprising inner and outer vessels having side and bottom walls spaced from each other, said outer and inner vessels having flanges seated respectively on said inner and outer covers to thereby support said receptacle, a tubular fitting extending through the bottom walls of both of said vessels, removably secured thereto and serving to detachably lock said vessels together, an upwardly extending hollow stem secured to said fitting and communicating with said tank through said fitting, a tube vertically slidable positioned in said stem and projecting upwardly therefrom to a position above said predetermined water level, said tube having an inlet opening adjacent its lower end communicating with the interior of said stem and a plurality of outlet openings in a side wall portion thereof which is normally above said water level, means for yieldingly supporting said tube in an up position relative to said stem, a coffee basket having a perforate bottom wall and inner and outer side walls extending upwardly from said bottom wall, said inner side wall constituting a sleeve vertically slidably disposed around said tube, releasable means for supporting said coffee basket in elevated position in said receptacle, said coffee basket and tube having interengaging portions whereby, when said basket supporting means is released and said basket permitted to move downwardly in said receptacle, the weight of said basket when charged with coffee, will cause said tube to be lowered in unison with said basket to thereby cause said outlet openings to be lowered to a position below said water level so as to permit water to flow from said tank, through said stem and tube and into said basket for percolation therethrough and discharge therefrom into said receptacle; the charged coffee basket being floated upwardly by the brewed coffee collected in said receptacle and said yielding tube supporting means being thereby permitted to return said tube to an elevated position in which said outlet openings are above said water level, means for supporting said coffee basket in re-elevated position to which it is floated as aforesaid, and a faucet connected to said receptacle for drawing the brewed coffee therefrom.

9. Coffee brewing equipment according to claim 8 wherein the said receptacle is supported so as to be partially above and partially below said water level, the upper end of said vertically slidable tube is closed, and wherein the said faucet is readily detachably connected to the receptacle.

10. Coffee brewing equipment according to claim 8 wherein the coffee basket side wall is provided on its inside, intermediate its upper and lower edges, with upwardly facing shoulder means; and wherein there is provided a cover having a perforated main wall portion and an upwardly offset peripheral flange adapted to be seated on said shoulder, means for releasably holding said cover flange so seated, a handle extending upwardly from said cover, whereby said basket and cover may be handled as a unit when said cover is held seated as aforesaid, and an outwardly extending flange-like formation on the up edge of said side wall adapted to be engaged by the means for supporting said basket in elevated position.

11. Coffee brewing equipment according to claim 8 wherein the coffee basket side wall is provided on its inside, intermediate its upper and lower edges, with upwardly facing shoulder means; and wherein there is provided a cover having a perforated main wall portion and an upwardly offset peripheral flange adapted to be seated on said shoulder, means for releasably holding said cover flange so seated, a handle extending upwardly from said cover, whereby said basket and cover may be handled as a unit when said cover is held seated as aforesaid, and an outwardly extending flange-like formation on the upper edge of said side wall adapted to be engaged by the means for supporting said basket in elevated position, and wherein said basket supporting means comprises a pair of horizontally pivoted latch arms mounted in diametrically opposed relationship on the receptacle, said latch arms each having upper and lower seats respectively for engaging said outwardly extending flange formation when the basket is in its initial position and in its re-elevated position.

12. Coffee brewing equipment according to claim 8 wherein the interengaging portions of said coffee basket and tube are initially spaced from each other so as to cause the charged coffee basket portion to strike said tube portion with a hammer-blow effect during the downward movement of the coffee basket, thereby to insure downward yielding of said tube.

13. Coffee brewing equipment comprising a tank for containing water, means for automatically maintaining water to a predetermined level in said tank, a receptacle supported in said tank so as to be partially above and partially below said water level, a coffee holder, means for temporarily supporting said coffee holder in elevated position in the upper portion of said receptacle, a conduit structure communicating with the inside of said tank and extending vertically in said receptacle and through said coffee holder, said conduit comprising an outer stationary tube which is attached to and extends upwardly from said receptacle, said outer tube being provided with an inwardly extending annular flange adjacent its upper end, and an inner tube which is freely slidable within said outer tube, said inner tube being provided with an outwardly extending annular flange adjacent its lower end and a plurality of laterally extending outlet openings adjacent its upper end, said outwardly extending flange being positioned within said outer tube below said inwardly extending flange, said flanges constituting interengageable valve seats, said valve seats serving to provide a fluid tight joint between said tubes when said inner tube is in a predetermined upper position, means biasing said inner tube to said predetermined upper position, said outlet openings being above said water line when said inner tube is in said predetermined upper position, and said coffee holder being vertically movable relative to said outer tube of said conduit and operative by its weight to lower said inner tube to position said outlet openings below said water level when said holder is released from said supporting means.

14. Coffee brewing equipment comprising a tank for containing water, means for automatically maintaining water to a predetermined level in said tank, a receptacle supported in said tank so as to be partially above and partially below said water level, a coffee holder, means for temporarily supporting said coffee holder in elevated position in the upper portion of said receptacle, a conduit structure communicating with the inside of said tank and extending vertically in said receptacle and through said coffee holder, said conduit comprising an outer stationary tube which is attached to and extends upwardly from said receptacle, said outer tube being provided with an inwardly extending annular flange adjacent its upper end, and an inner tube which is freely slidable within said outer tube, said inner tube being provided with an outwardly extending annular flange adjacent its lower end and a plurality of laterally extending outlet openings adjacent its upper end, said outwardly extending flange being positioned within said outer tube below said inwardly extending flange, said flanges constituting interengageable valve seats, said valve seats serving to provide a fluid tight joint between said tubes when said inner tube is in a predetermined upper position, means biasing said inner tube to said predetermined upper position, said outlet openings being above said water line when said inner tube is in said predetermined upper position, said coffee holder being vertically slidably disposed around said inner tube, and said coffee holder and said inner tube having interengaging portions whereby, when said holder is released from said support means and said holder permitted to move downwardly in said receptacle, the weight of said holder when charged with coffee, will cause said inner tube to be lowered in unison with said basket to thereby cause said outlet openings to be lowered to a position below said water level so as to permit water to flow from said tank, through said outer and inner tube and into said holder.

15. Coffee brewing equipment comprising a tank for containing water, means for maintaining water to a predetermined level in said tank, a receptacle supported in said tank so as to be partially above and partially below said water level, a coffee holder, releasable means for supporting said coffee holder in elevated position in said receptacle, a conduit structure communicating with the inside of said tank and extending vertically in said receptacle and through said coffee holder, said conduit structure comprising an outer tube which is attached to and extends upwardly from said receptacle, an inner tube vertically slidable within said outer tube and projecting upwardly therefrom to a position above said predetermined water level, said inner tube having a plurality of outlet openings in a side wall portion thereof which is normally above said water level, means for yieldingly supporting said inner tube in an up position relative to said outer tube, said coffee holder being vertically slidably disposed around said inner tube, said coffee holder and inner tube having interengaging portions whereby, when said coffee holder supporting means is released and said holder permitted to move downwardly in said receptacle, the weight of said holder when charged with coffee will cause said inner tube to be lowered in unison with said holder to thereby cause said outlet openings to be lowered to a position below said water level so as to permit water to flow from said tank, through said outer and inner tubes into said holder for percolation therethrough and discharge therefrom into said receptacle, the charged coffee holder being floated upwardly by the brewed coffee collected in said receptacle and said yielding inner tube supporting means being thereby permitted to return said inner tube to an elevated position in which said outlet openings are above said water level.

HANS A. OLSON.
CHRISTINA O. C. OLSON.

REFERENCES CITED

The following references are of record in the file of this patent:

UNITED STATES PATENTS

| Number | Name | Date |
|---|---|---|
| 60,204 | Lee | Dec. 4, 1866 |
| 218,867 | Etzensberger | Aug. 26, 1879 |
| 450,208 | Wheelwright | Apr. 14, 1891 |
| 996,305 | Bachelder | June 27, 1911 |
| 1,290,546 | Hachmann | Jan. 7, 1919 |
| 1,457,037 | Krentz | May 29, 1923 |
| 1,506,712 | McAllen | Aug. 26, 1924 |
| 1,803,232 | Carozzi | Apr. 28, 1931 |
| 2,065,149 | Newman | Dec. 22, 1936 |
| 2,181,246 | McNeil | Nov. 28, 1939 |
| 2,288,240 | Herman | June 20, 1942 |
| 2,313,112 | Wolcott | Mar. 9, 1943 |
| 2,366,384 | Cavicchioli | Jan. 2, 1945 |

FOREIGN PATENTS

| Number | Country | Date |
|---|---|---|
| 6,669 | Great Britain | 1884 |
| 279,110 | Great Britain | Mar. 1, 1928 |